United States Patent

Schadhauser

[11] Patent Number: 5,320,548
[45] Date of Patent: Jun. 14, 1994

[54] SCREW-IN ADAPTER FOR SINGLE-BASED LOW-PRESSURE DISCHARGE LAMP, ESPECIALLY COMPACT FLUORESCENT LAMP

[75] Inventor: Klaus Schadhauser, Munich, Fed. Rep. of Germany

[73] Assignee: Patent-Treuhand-Gesellschaft F. Elektrische Gluehlampen mbH, Munich, Fed. Rep. of Germany

[21] Appl. No.: 47,233

[22] Filed: Apr. 14, 1993

[30] Foreign Application Priority Data

May 11, 1992 [DE] Fed. Rep. of Germany ....... 9206294

[51] Int. Cl.$^5$ ............................................. H01R 33/02
[52] U.S. Cl. ................................... 439/236; 439/76; 439/646; 313/318
[58] Field of Search ............. 439/76, 78, 83, 232, 439/236, 646; 313/318

[56] References Cited

U.S. PATENT DOCUMENTS 4,688,874  8/1987  Bjorkman ...................... 439/646 X
4,944,684  7/1990  Leibowitz ........................... 439/76

FOREIGN PATENT DOCUMENTS 0179473  4/1986  European Pat. Off. .
0447957  9/1991  European Pat. Off. .
WO/8504769  12/1985  PCT Int'l Appl. .

Primary Examiner—Khiem Nguyen
Attorney, Agent, or Firm—Frishauf, Holtz, Goodman & Woodward

[57] ABSTRACT

To permit use of a compact fluorescent lamp having a base with projecting terminal pins (9) in an ordinary standard Edison lightbulb socket, an adapter has a lightbulb thread (2) and the housing body includes a reception well (5) to receive a locating plate or plug (6) from the lamp. To relieve stresses and strains on reception terminals (11) which are electrically connected to a printed circuit board (3) within the adapter body, the reception terminals, and preferably the connecting lugs thereof, are formed with openings which are engaged by matching projections formed on the housing body, and preferably by projections extending from the wall defining the well (5) which receives the locating plate or lug (6) of the lamp. This avoids bending, and hence damage to the printed circuit board upon insertion of the lamp pins (9) in the spring contact portions (11a) of the reception terminals since assembly stresses are accepted by the housing body and not by the printed circuit board.

2 Claims, 3 Drawing Sheets

SCREW-IN ADAPTER FOR SINGLE-BASED LOW-PRESSURE DISCHARGE LAMP, ESPECIALLY COMPACT FLUORESCENT LAMP

Reference to related publication, assigned to the assignee of the present application:
European Patent 179 473, Rasch et al

FIELD OF THE INVENTION

The present invention relates to an adapter to permit use of a low-pressure discharge lamp, and especially a compact fluorescent lamp having a pin-base in a screw-in socket of the standard lightbulb Edison type, and more particularly to an adapter construction which is sturdy and permits reliable retention of accessory or auxiliary circuits within the adapter housing.

BACKGROUND

An adapter of the type to which the present invention relates is illustrated in the referenced European Patent 179 473, Rasch et al, assigned to the assignee of the present application. The adapter as known has a two-part housing. The lower part of the housing has a base which is threaded for threaded reception in a standard lightbulb socket of the Edison type. The upper part of the housing for the adapter is arranged to receive a guide plate, or guide post, of a compact fluorescent lamp and is formed with openings to permit passage of terminal contact pins into the interior of the adapter housing. The interior of the adapter housing retains a circuit board, typically a printed circuit board, on which electrical and electronic components are secured, designed to operate the compact fluorescent lamp from standard residential supply networks, for example 110 V, 60 Hz. Reception terminals are located within the housing, secured to the printed circuit board, and positioned to receive the contact pins of the fluorescent lamp. The reception terminals have spring contacts to engage against the contact pins from two sides.

It has been found in use that insertion, and particularly repeated insertion of a fluorescent lamp for which the adapter is intended, exerts a substantial pressure on the printed circuit board. The printed circuit board, thus, is subject to bending, resulting in damage to the circuits thereon, which, in turn, leads to failure of the electrical operation of the adapter.

THE INVENTION

It is an object to provide an adapter for a single-based low-pressure discharge lamp, typically a compact fluorescent lamp, in which the reception contacts or reception terminals within the adapter are securely retained in such a manner that insertion pressure is not transferred to the printed circuit plate. In other words, to separate the electrical and mechanical effects on the reception terminals as far as the printed circuit board is concerned.

Briefly, the adapter includes an arrangement to relieve strain or stress on the printed circuit board upon insertion of a low-pressure discharge lamp in the adapter by providing a mechanical connection between the reception terminals and a wall or body portion thereof, so that stresses and strains applied on the reception terminals upon fitting a lamp on the adapter can be accepted by the housing portion of the adapter, rather than by the printed circuit board.

In accordance with a preferred feature of the invention, an interengaging projection-and-recess arrangement is provided, for example, and most simply, formed by an aperture punched into a blade of the reception terminals, and engaged by a projection extending from the well housing of the adapter which receives, in the interior thereof, a locating plate or post formed on a standard base of a fluorescent lamp.

The arrangement has the advatage that the reception terminals in the adapter are mechanically secured to the adapter body or adapter housing, and retention of the reception terminal is not solely placed on the printed circuit board. By coupling the terminals directly to the housing which, typically, is made of plastic, that is, an insulating material, forces applied against the terminals are accepted by the housing or body of the adapter and are isolated from the printed circuit board, so that the printed circuit board is relieved of stresses and strains.

DRAWINGS

DETAILED DESCRIPTION

Figure 1:
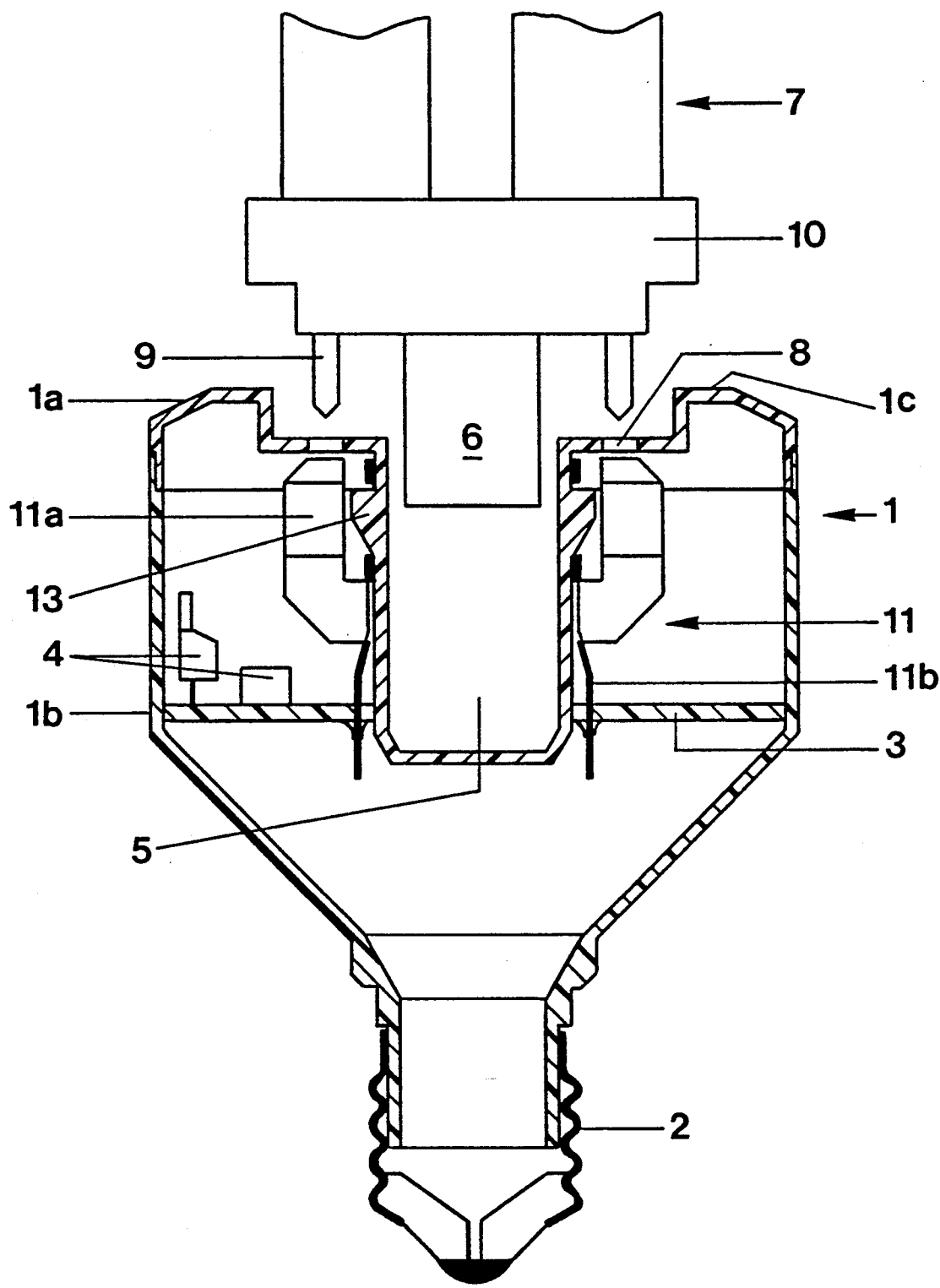
FIG. 1 is a side view, partly in section, of the adapter in accordance with the invention.

The adapter 1 has a housing or body which, preferably, is formed of two parts 1a, 1b, which are snapped together, in a well-known interlock arrangement, to couple the elements 1a, 1b, irremovably. The lower part 1b terminates in a standard lightbulb base 2 of the type E27, to fit a standard lightbulb socket. A printed circuit board 3 is located in the lower part 1b of the housing, which carries circuit elements 4 of an accessory circuit or a ballast circuit for operation of the low-pressure discharge lamp. Rather than using an electronic starting-and-operating circuit, an inductive ballast can also be used, secured to the printed circuit or connection plate 3.

The upper part 1a includes an upper wall 1c which is formed with a recess or well 5 (FIG. 1) to receive a locating or guide plate or post 6 forming part of the base 10 of the lamp 7. The reception well 5 extends through the printed circuit board 3, which is formed with a suitable reception opening. The surface 1c, further, is formed with openings 8 to permit passage of terminal pins 9 extending from the base 10 of the lamp 7.

The terminal pins 9 of the lamp 7, when assembled with the adapter, are received in reception terminals 11 located in the adapter, within the housing walls.

The reception terminals 11 are, typically, made of nickel-plated copper-bronze; they are unitary elements which are springy and have contact springs 11a which engage the contact pins 9 of the lamp from two sides. In addition, the terminals are formed with an attachment lug 11b which is fitted through openings of the printed circuit board 3, and soldered to suitable conductive tracks thereon.

Figure 2:
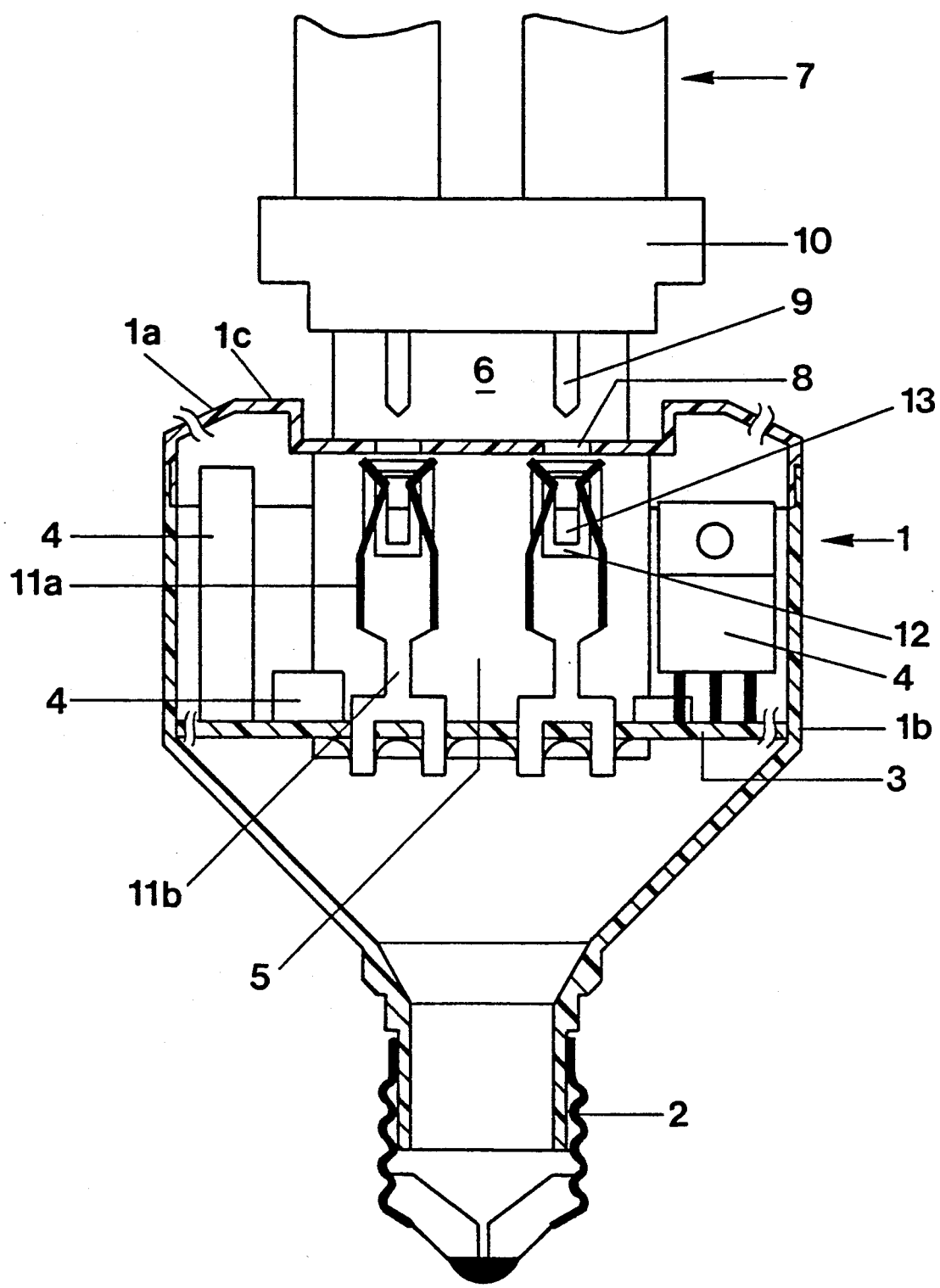
FIG. 2 is a side view, that is, a view similar to FIG. 1 but axially rotated by 90° with respect to FIG. 1.

In accordance with a feature of the invention, the contact terminals 11, and, for example, part of the attachment lugs 11b, are formed with an opening 12 which receives a projection 13 to engage through the opening 12 and interlock therewith, as shown in FIG. 2.

Figure 3:
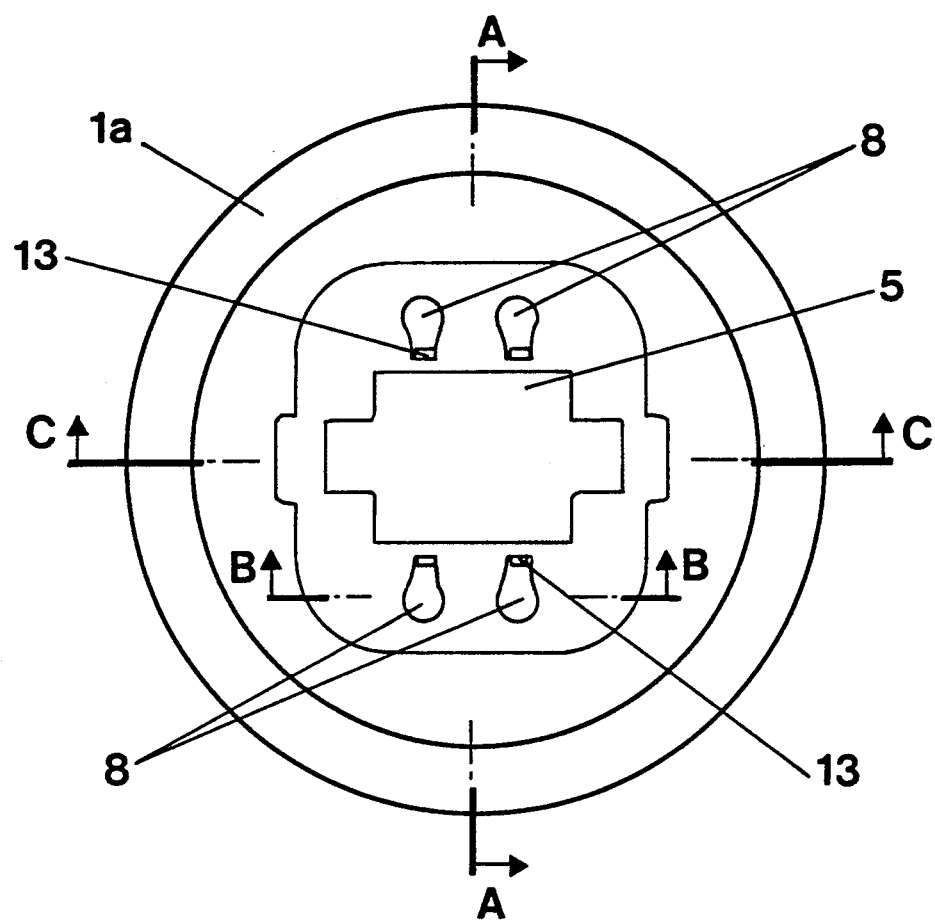
FIG. 3 is a top view of the adapter in accordance with the invention.

FIG. 2 is a side view of the adapter, partly in section. The upper part 1a of the adapter housing and the circuit board 3 are cut along line B—B of FIG. 2. The lower part 1b of the adapter housing and the socket 2 are cut along line C—C of FIG. 3. Cut lines are inserted between differently cut parts of the adapter. The projection 13 is positioned on the body of the housing at the outer wall of the well-shaped depression 5 of the upper part 1a of the adapter body 1.

Various changes and modifications may be made. For example, there are other ways to secure the reception terminals 11 within the housing; it is only necessary, then, to so form the housing that an interengaging strain and stress-relieving fit between the housing and the reception terminal can be provided, without interfering with the electrical contact between the terminals 11 and the pins 9 of the lamp. The arrangement of projection-and-recess can also be reversed. For example, rather than forming the reception terminals 11 with an opening into which a nose-like projection from the housing can engage, it is equally possible to form the terminals with barbs which engage in a slot formed in a housing wall, and bind against the housing wall, or are otherwise retained in the housing wall; for example, the housing wall may be formed with a recess or a small opening for engagement by a barb, or the barb, if sharp enough, can form its own recess in the housing upon insertion.

I claim:

1. For combination with a single-based low-pressure discharge lamp, especially a compact fluorescent lamp, an adapter for said lamp to permit said lamp to be screwed into a standard screw-in Edison-type socket, wherein said lamp has a lamp base including a base body (10) and a plate or plug-like locating projection (6) extending from said base body, and contact pins (9) projecting from the base body, said adapter (1) having an adapter body (1) optionally in form of two interlocked body sections or parts (1a, 1b), and defining an upper and lower end portion;

a standard Edison-base terminal (2) projecting from the body at the lower end portion thereof;

accessory circuit means (3, 4) including a circuit board (3) located in said body;

reception terminals (11) electrically connected and attached to said circuit board, positioned and dimensioned for engagement with the contact pins (9) of the lamp (7); and an upper wall (1c) at the upper end portion of the body, said upper wall being formed with contact pin reception openings (8) to permit passage of the contact pins thereto and further being formed with a well-like depression (5) for reception of the locating projection or plug (6) of the lamp (7), said adapter further comprising, in accordance with the invention, means for relieving stress and strain on the printed circuit board (3) by the reception terminals (11) upon engagement with the contact pins (9) of the lamp upon insertion of the lamp (7), said strain and stress-relieving means including an interengaging projection-and-recess connection forming a mechanical connection between the reception terminals (11) in the adapter and the body (1) of the adapter;

wherein the recess portion of the interengaging projection-and-recess connection comprises an opening (12) formed in the respective reception terminal (11);

and the projection portion comprises an extension (13) from a wall defining said well-like depression (5) and having an engagement surface fitting into the opening of the respective terminal and securely retaining the terminal on said projection; and wherein the reception terminals (11) include reception contact springs (11a) and an attachment lug (11b), said attachment lug (11b) being electrically connected and mechanically attached to the circuit board, and, further, being connected by said mechanical connection to the adapter body (1).

2. The adapter of claim 1, wherein said mechanical connection is located at a wall portion of the upper end portion (1a) of the adapter body.

* * * * *